United States Patent [19]

Kerner et al.

[11] 4,102,651
[45] Jul. 25, 1978

[54] ULTRASONIC ATOMIZER FOR WASTE SULFURIC ACID AND USE THEREOF IN ACID CRACKING FURNACES

[75] Inventors: Walter Kerner, Hermulheim; Friedrich Mahler, Koln-Nippes; Heinrich Peters, Lowenich, all of Fed. Rep. of Germany

[73] Assignee: DAVY POWERGAS GmbH, Cologne, Fed. Rep. of Germany

[21] Appl. No.: 719,973

[22] Filed: Sep. 2, 1976

Related U.S. Application Data

[60] Continuation of Ser. No. 579,207, May 20, 1975, abandoned, Division of Ser. No. 405,908, Oct. 12, 1973, Pat. No. 3,908,904.

[30] Foreign Application Priority Data

Oct. 14, 1972 [DE] Fed. Rep. of Germany ....... 2250521
Nov. 17, 1972 [DE] Fed. Rep. of Germany ....... 2256442

[51] Int. Cl.² .................. C01B 17/50; F27B 15/02; F23D 11/34
[52] U.S. Cl. .................... 23/277 R; 23/262; 423/540; 239/102; 239/4; 261/DIG. 9; 110/238
[58] Field of Search ................. 23/277 R, 252 R, 262, 23/278; 423/540; 239/102, 4; 431/1, 2; 261/DIG. 9, DIG. 48; 110/7 B

[56] References Cited

U.S. PATENT DOCUMENTS

| | | | |
|---|---|---|---|
| 2,406,890 | 9/1946 | Mohr | 423/540 |
| 2,481,620 | 9/1949 | Rosenthal | 239/4 X |
| 3,595,806 | 7/1971 | Prahacs et al. | 23/277 R |

FOREIGN PATENT DOCUMENTS 1,306,561  2/1973  United Kingdom ................. 110/7 B

*Primary Examiner*—James H. Tayman, Jr.
*Attorney, Agent, or Firm*—Millen & White

[57] ABSTRACT

A furnace chamber of substantially circular cross section having a ceiling and a side wall, a burner positioned adjacent said ceiling and substantially evenly spaced from said side wall, a plurality of ultrasonic atomizer assemblies positioned around said burner in a concentric pattern adjacent said ceiling, each of said ultrasonic atomizer assemblies including: (a) means for converting a feed stream of the waste sulfuric acid into a coarse spray, and (b) means for further atomizing the coarse spray by passing it through a field of ultrasonic sound, and a gas flow constricting means transversing said chamber and spaced from said ceiling in a distance of about 1 to 4 times the length of the diameter of said chamber.

18 Claims, 5 Drawing Figures

ULTRASONIC ATOMIZER FOR WASTE SULFURIC ACID AND USE THEREOF IN ACID CRACKING FURNACES

This is a continuation, of application Ser. No. 579,207, filed May 20, 1975 now abandaned which is a division of Ser. No. 405,908, filed Oct. 12, 1973, now U.S. Pat. No. 3,908,904, issued Sept. 30, 1975.

BACKGROUND OF THE INVENTION

This invention relates to ultrasonic atomizers for the atomization of waste sulfuric acid in cracking furances, as well as to a furance equipped with these ultransonic atomizers.

In a number of chemical processes, waste sulfuric acids containing varying amounts of impurities are obtained, which latter can be removed only by expensive procedures. Therefore, these acids, containing besides water primarily organic compounds, e.g. sulfonic acids, sulfates, such as, for example ammonium sulfate or metallic sulfates, or metallic oxides, are split reductively at temperatures of between about 850° and 1250° C., forming an $SO_2$-containing cracked gas which can be conventionally processed according to the contact method to obtain concentrated sulfuric acid or oleum. The thermal energy required for the cracking step is generated by the combustion of oil or heating gas in the cracking furnace.

Heretofore, cracking yields of up to 98% have been attained, i.e. 98% of the hexavalent sulfur contained in the waste sulfuric acid is present, after the cracking step, at sulfur dioxide, and the remainder is further in the hexavalent form as sulfuric acid vapor and/or sulfur trioxide. Besides, the cracked gases are largely laden with ashes produced by the combustion of the contaminants contained in the waste sulfuric acids. Thus, the hot cracking gases must be cooled and cleaned before they are fed to the sulfuric acid plant. It the cooling of the cracked gases from, for example, about 1000° C. to about 350° C., the waste heat thereof is generally utilized for air heating and/or high-pressure steam generation in air preheaters or waste heat boilers. It was found that the two percent of unreduced sulfuric acid and in some cases sulfuric acid compounds in the cracked gases, together with the other gas impurities, can lead to corrosive attacks on the air preheaters or waste heat boilers. During the subsequent gas scrubbing step, the hexavalent sulfur compounds contained in the cracked gas enter at least partially into the scrubbing water and thus are lost for the sulfuric acid recovery. Consequently, there is the need for increasing the cracking yield to an optimum value lying almost at 100%.

In order to introduce the waste sulfuric acid into the cracking furnace, air atomizer nozzles of a large cross section have heretofore been preferably employed for the feeding and discharging of the acid, since most of the waste sulfuric acids contain considerable impurities in the form of solid substances and/or polymerization products. Because of these contaminants, pure pressure atomizer nozzles tend to clog, resulting in disturbances in the operation. With the heretofore utilized air atomizer nozzles, it has been necessary to use, for throughput efficiencies of up to 20 tons of acid per hour and more, 0.5 to 0.8 $Mn^3$ of air under a pressure of 5000 mm. $H_2O$ column per kg. of acid, depending on the constitution of the acid, in order to atomize the acid. In this process, droplet sizes of between 400 and 600 $\mu$ could be obtained, with the most frequent droplet size being 500 $\mu$. The disadvantage which is particularly significant for the further processing of the cracked gas to sulfuric acid is, in the air atomization method, the dilution of the cracked gas, resulting in increased expenditures for extra apparatus in the sulfuric acid portion of the total plant. In contrast thereto, if the excess of air is reduced at the oil burners in order to compensate for this increased consumption of air, a larger furnace space is required for complete combustion, and the cracking process, with irregular acid atomization, becomes more susceptible to breakdown. An improvement of the yield of the cracking process by increasing the residence time in the furnace leads perforce to an increase in furnace volume and thus to rising initial investment costs.

Starting with the above-explained problem, the present invention resides in the provision of an atomizer and a cracking furnace for waste sulfuric acid, wherein, with a reduced amount of atomizing air, or without the use of atomizing air, a cracking yield of almost 100% is attained. In particular, this objective is to be produced by optimizing the atomization of the acid and the fuel combustion in the furnace.

SUMMARY OF THE INVENTION

The ultrasonic atomizer nozzle assembly of this invention comprises an ultrasonic generator for generating an ultrasonic field, said generator having an operative end face and resonance chamber having an outlet opening disposed at said end face, a first conduit for feeding the operating medium to said chamber, and means for producing ultrasonic sound in said operating medium, a second conduit for feeding a stream of said waste sulfuric acid, an atomizer for converting said stream into a coarse spray positioned adjacent said operative end face of said ultrasonic generator, one of said atomizer and said resonance chamber substantially surrounding the other, whereby the ultrasonic sound energy is distributed throughout said coarse spray.

Waste sulfuric acid either contains initially solid substances, or is freed of such substances during the atomizing step. Therefore, pressure and rotary atomizers for waste sulfuric acids tend to clog rapidly and thus are quickly prone to disturbances in operation, if the atomization is to be conducted so that the fineness required for an extensive cracking step is produced. It has now been found that these disturbances are avoided and yet a considerable increase in the cracking yield can be attained by conducting a coarse atomizing by means of the pressure or rotary atomizer into an ultrasonic field. The nozzle width and/or the ejected film thickness is selected to be so large that the impurities contained in the acid cannot impair the atomization process. Subsequently, the thus-produced droplet cone and/or film is extremely finely atomized in the ultrasonic field, resulting in an increase in the cracking yield of $SO_2$ of up to at least 99.5%, Thereby, the susceptibility of corrosion of the cooling devices connected downstream of the cracking furnace is reduced, and the yield of regenerated sulfuric acid is increased.

DETAILED DISCUSSION

The frequency of the ultrasonic field is suitably between 10 and 1000 kilohertz, especially between 20 and 100 kilohertz. Due to the atomization of the waste sulfuric acid, droplets are obtained in the range of between 1 and 200 $\mu$, especially between 50 and 80 $\mu$. Accordingly, by means of the ultrasonic atomization of this invention, droplet sizes can be obtained which are considerably smaller than the solids frequently contained in the acid, which solids can have a diameter of up to 1 mm. or higher.

In accordance with the preferred embodiment of this invention, the pressure or rotary atomizer is accommodated in a central cavity of the ultrasound generator, wherein the nozzle of the pressure atomizer or the centrifugal edge of the rotary atomizer is arranged in the end surface area of the ultrasound generator. Due to the construction of the ultrasound generator in the form of a hollow cylinder, in the interior of which is the pressure or rotary atomizer, an optimum utilization of the ultrasonic field is achieved for the fine atomization, and a compact atomizer construction suitable for installation in cracking furnaces results therefrom.

Suitably, the annular slot between the pressure or rotary atomizer and the ultrasound generator is in communication with a compressed-gas source via a conduit. The gas feed to the annular slot between the atomizer and the ultrasound generator is merely to avoid the entrance of the acidic furnace atmosphere into this annular slot and any possible condensation and corrosion on the internal parts of the ultrasonic atomizer. Accordingly, the conduit serves only to maintain a gas buffer in the annular slot. The air feed into the furnace is effected almost exclusively at the burners, rather than through the annular slot between the atomizer and the ultrasound generator. The nebulization is attained, without the aid of an atomizing gas, solely by the rapid introduction of the pre-atomized acid into the ultrasonic field. The droplets produced by the preliminary atomization have an average particle size of between 0.2 and 2 mm.

In accordance with the preferred embodiment of this invention, an ultrasonic atomizer is utilized operating with low-pressure steam as the operating medium for the ultrasound generator.

For the generation of the ultrasonic field, low-pressure steam is employed of 0.6 – 10 atmospheres gauge, preferable 0.6 – 4 atmospheres gauge. The use of steam as the operating medium for the ultrasound generator has the advantage that the steam can be condensed out of the cracked gas and thus does not result in a dilution of the contact gas. The ultrasound generator of the acid atomizer of this invention can also be operated, in place of steam, with compressed air or a combustible gas. For the operation of the ultrasound generator, only a fraction (maximally 50%) of the amount of air is required which is otherwise necessary for the atomization of the same quantity of waste acid in an air atomizer nozzle. The operating medium flows at very high speed along the deflection element into the annular resonance chamber and is excited therein to ultrasonic vibrations. The high-energy sonic waves are conducted to the acid cone to be atomized, and the latter is extremely finely divided by the sonic field. The ultrasonic atomizer is usable, besides for the nebulization of waste sulfuric acid, also for the atomization of waste solutions containing salts (ammonium salts) of sulfur-containing acids.

Preferably, the rotary atomizer consists of a cup axially joined to a rotary drive shaft and of a feed pipe for the acid terminating in the cup. The feed pipe has lateral openings, through which the acid exits radially and is conveyed against the inner surface of the cup, the latter rotating at a speed of about 4000 – 7000 r.p.m., depending on the throughput efficiency. The sheet formed on the internal surface of the cup by the centrifugal effect is torn apart at the cup edge into droplets which, due to their centrifugal force, enter the sonic field of the ultrasound generator. Suitably, the rotary drive shaft is constructed as a quill shaft, and the feed pipe is extended axially through the quill shaft for rotation therewith, up into the cup. This provides a simple feed of the acid into the cup rotating at a high speed.

In its most general scope, the invention concerns as ultrasonic atomizer for the atomization of waste sulfuric acid in cracking furnaces, consisting of an ultrasound generator with an annular resonance chamber disposed at the end face, a conduit for the feeding of the operating medium, and a deflecting element for the guidance of the stream of operating medium from the feed conduit into the resonance chamber, wherein the atomizer is characterized in that the mouth of a feed duct for the waste sulfuric acid to be atomized is arranged in the close proximity to the ultrasound generator.

Such ultrasonic atomizers operating with an ultrasound generator (Hartmann generator) are known per se in ultrasonic oil burners. However, heretofore, the general opinion was that the atomizing principle utilized in ultrasonic oil burners could not be suitable for the atomization of waste sulfuric acids, because heating oil is a practically homogeneous liquid, while the contaminated waste sulfuric acids either initially contain solids or precipitate solids during the atomization. Consequently, waste sulfuric acid must be introduced in a considerably larger layer thickness into the ultrasonic field than heating oil, so that it was to be expected that the fine degree of atomization known from the oil could not be attained in case of waste sulfuric acids. Also, there have been misgivings insofar as the endothermic acid cleavage, with irregular atomization (caused by solid components and fluctuating atomization behavior on account of changes in the composition and thus in the physical values governing for the atomization process, such as surface tension, viscosity), is much more susceptible to disturbances (flame subcooling) than the exothermic oil combustion.

In accordance with the preferred embodiment of this invention, the ultrasound generator is surrounded by the outlet opening of the feed duct for the waste sulfuric acid. The annular exit slot of the feed duct has preferably a maximum slot width of 1 mm. An atomizing nozzle with such an external ring-shaped acid discharge slot is suitable for the atomization of waste sulfuric acids having solid particles of up to a size of 0.5 mm. in diameter.

In accordanc with another embodiment of the invention the discharge opening of the feed duct for the waste sulfuric acid is arranged centrally in the ultrasound generator, especially axially within the deflection element. The feed duct is suitably an axially linear bore, the diameter of which can be up to maximally 10 mm. This embodiment is suitable for strongly contaminated waste sulfuric acids having solids particles of up to several millimeters in diameter.

The furnace for the waste acid dissociation is characterized, according to the invention, in that a burner for the fuel required for the acid cracking process is centrally arranged in the furnace ceiling, and the ultrasonic atomizers are distributed around the burner, and that a furnace body constriction is provided at a spacing from the furnace ceiling amounting to 1 – 4 times, especially 1.5 – 3 times the diameter of the furnace. The bricklined cracking furnace has generally a cylindrical configuration and is preferably vertically disposed. By the arrangement, according to this invention, of the burner, the acid atomizers, and the furnace body constriction, an axial current is produced in the furnace chamber from the furnace ceiling to the furnace body constriction, and a gaseous flow is formed at the periphery of the furnace chamber which is directed from the constriction to the furnace ceiling. Thereby, the almost complete cracking of the waste sulfuric acid is achieved in a relatively small furnace volume, resulting in a reduction of the height or length of the furnace as compared to heretofore customary cracking furnaces.

Advantageously, the ultrasonic atomizers are distributed around the burner in a uniform concentric arrangement. This provides an axially symmetrical gas circulation in the furnace chamber. Furthermore, the furnace body constriction is suitably equipped with gas passage openings on the furnace wall. Thus, the objective is attained that only those portions of the hot combustion gas stream where practically a complete cracking has been attained can pass through the passage openings, rather than gas still laden with acid mist. The ultrasonic atomizers also permit the alteration of the configuration of the acid mist from an elongated up to a short, bulging shape, likewise resulting in a maximum utilzation of the cracking furnace volume and an increase in the cracking yield.

Advantageously, the burner for the production of the cracking heat in the furnace is a pulsed oil burner. The pulsed oil burner is arranged in a burner muffle axially attached to the ceiling of the cracking furnace, so that already the hot combustion gases enter at a high speed (up to 150 m./sec.) in parallel to the acid mists into the cracking furnace. As compared to the heretofore customary heating of the cracking furnaces with directly attached burners, there is no longer the danger that a flame subcooling is caused by the endothermic acid cracking process, and accordingly a disturbance of the cracking step is avoided.

A special advantage of the ultrasonic atomizers of this invention in cracking furnaces for waste sulfuric acid resides in that only a relatively minor amount of low-pressure steam as compared to the amount of acid to be atomized is required for the production of the high-energy ultrasonic field. The steam consumption ranges between 0.1 and 0.3 kg. of steam per kg. of waste sulfuric acid, depending on the constitution of the acid. This results in advantages for the cracking process and the subsequent sulfuric acid production, as can be seen from the following comparison of the ultrasonic atomizer of the present invention with the acid atomization by means of air atomizer nozzles.

The requirements and the resultant products are as follows for the cracking of 1 kg. of waste sulfuric acid having the chemical composition of:
58.00% $H_2SO_4$
2.00% organic substance
32.03% $H_2O$
7.77% $NH_3$
0.2% annealing residue

| | | Air Atomizer Nozzle | Ultrasonic Nozzle |
|---|---|---|---|
| (1) Atomizing air needed (5000 mm. $H_2O$ column) t = 50° C. | $Nm^3$/kg. Acid | 0.5 | — |
| (2) Atomizing *vapor needed (SS 4 atm. gauge) | kg./kg. Acid | — | 0.1 – 0.2 |
| (3) Fuel quantity for producing needed thermal energy for cracking process (fuel oil with 9800 kcal./kg.) | kg./kg. Acid | 1.25 | 1.01–0.986 |
| (4) Air excess for fuel combustion at burners (combustion air preheating) | n ° C. | 1.03 500 | 1.27–1.274 500 |
| (5) Cracked gas quantity discharged (moist) cracking furnace | $Nm^3$/kg. Acid | 2.72 | 2.56–2.68 |
| (6) Contact gas quantity at entrance to $H_2SO_4$ plant (based on same $O_2/SO_2$ ratio 1.32) | $Nm^3$/kg. Acid | 3.09 | 2.95–2.94 |

*saturated steam

It can be seen from the comparison that, with the use of the steam-operated ultrasonic atomizer of this invention, there is a reduction of the fuel consumption in the cracking furnace by 25%, a decrease in the thus-produced cracked gas by 2–5% and in the amount of contact gas by 4.5%. This represents an essential saving in operating devices and a reduction in the initial investment costs, since the size of the sulfuric acid plant connected thereafter is determined substantially by the amount of the contact gas to be passed therethrough. Steam-operated ultrasonic atomizers make it possible to work the pulsed burner with an air excess of $n = 1.27$, so that burned-out combustion gases enter from the muffle of the pulsed burner into the cracking furnace chamber, whereas, in air atomizers and directly attached burners operated with an air excess of $n = 1.03$, the complete combustion is attained only after the flame extends about 2–3 m. into the furnace chamber, whereby, in case of an irregular acid atomization, a flame subcooling and a disturbance of the cracking process can easily occur. In spite of the thus-demonstrated advantages inherent in the ultrasonic atomizer, the result is a reduction of the contact gas quantity, as indicated in the table, together with a corresponding increase of the sulfur dioxide concentration in the contact gas.

DESCRIPTION OF THE DRAWINGS

The invention will be described in greater detail with reference to the drawings as set forth below, in which:

FIG. 1 shows an axial sectional view of a first embodiment of the ultrasonic atomizer nozzle of this invention;

FIG. 2 shows an axial sectional view of a second embodiment of the ultrasonic atomizer nozzle of this invention;

Figures 1, 2:
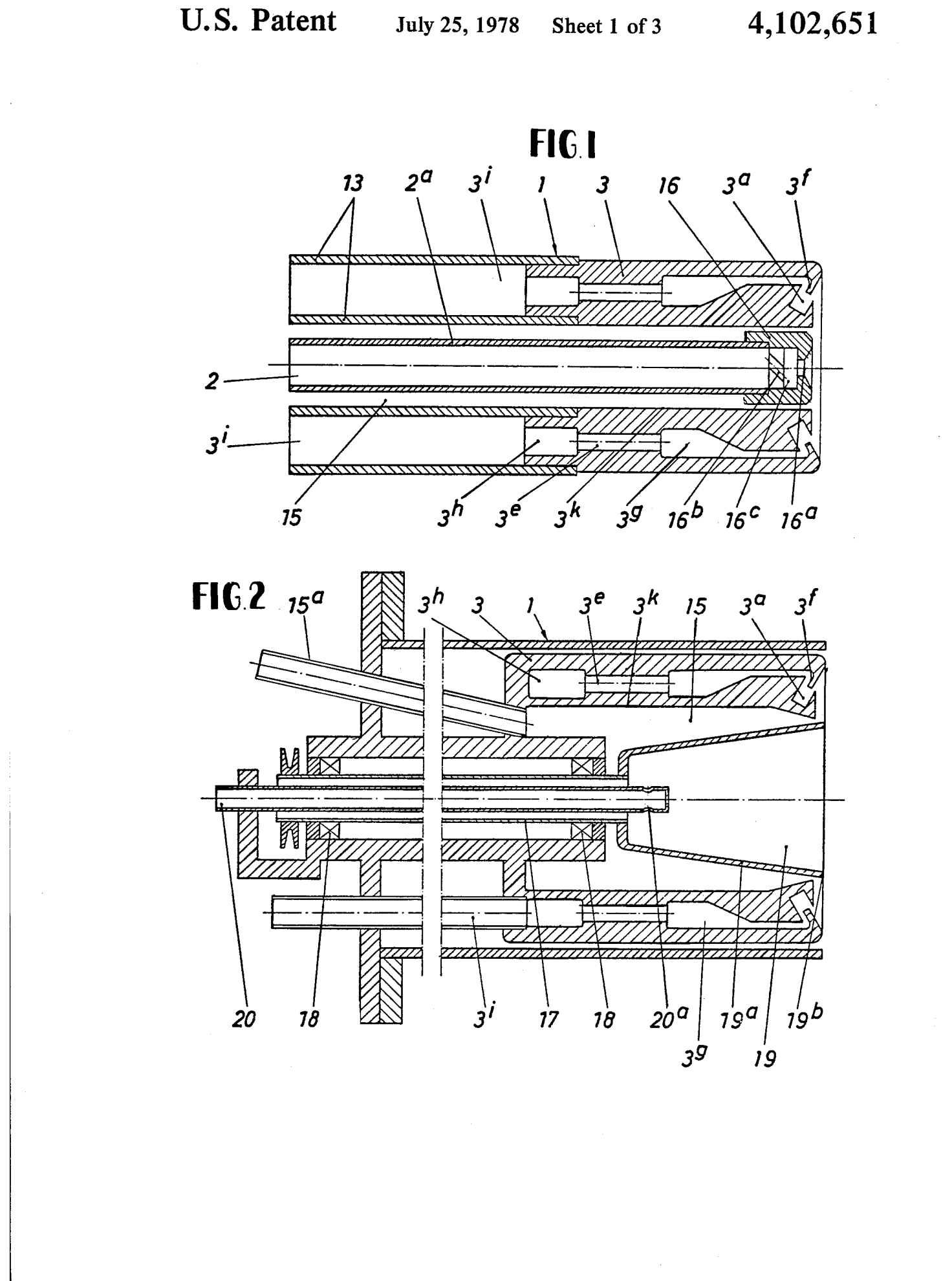
Figure 3:
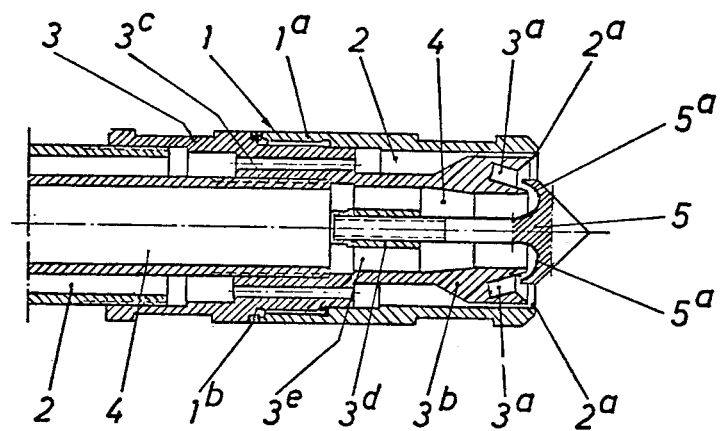
FIG. 3 shows an axial sectional view of a third embodiment of the ultrasonic atomizer nozzle of this invention.
Figure 4:
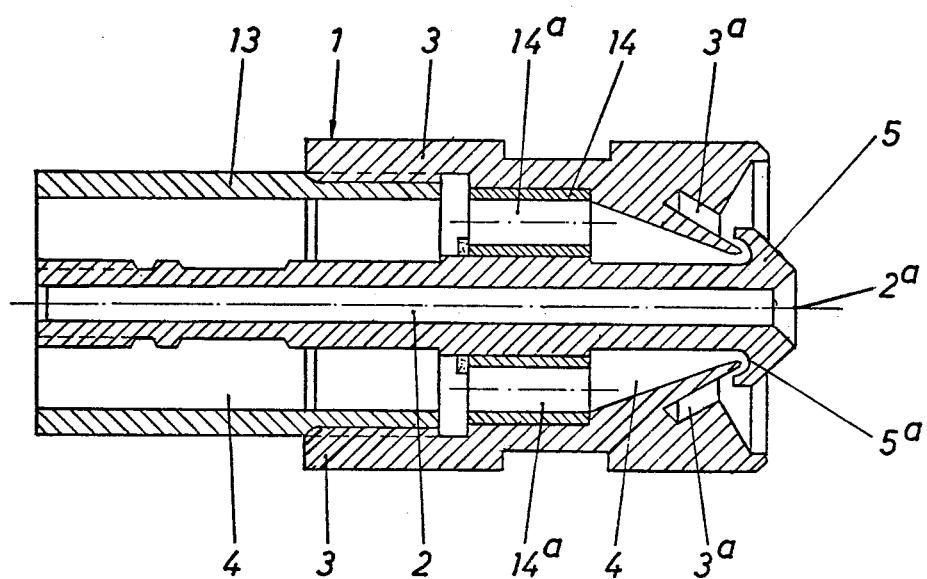
FIG. 4 shows an axial sectional view of a fourth embodiment of the ultrasonic atomizer nozzle of this invention.
Figure 5:
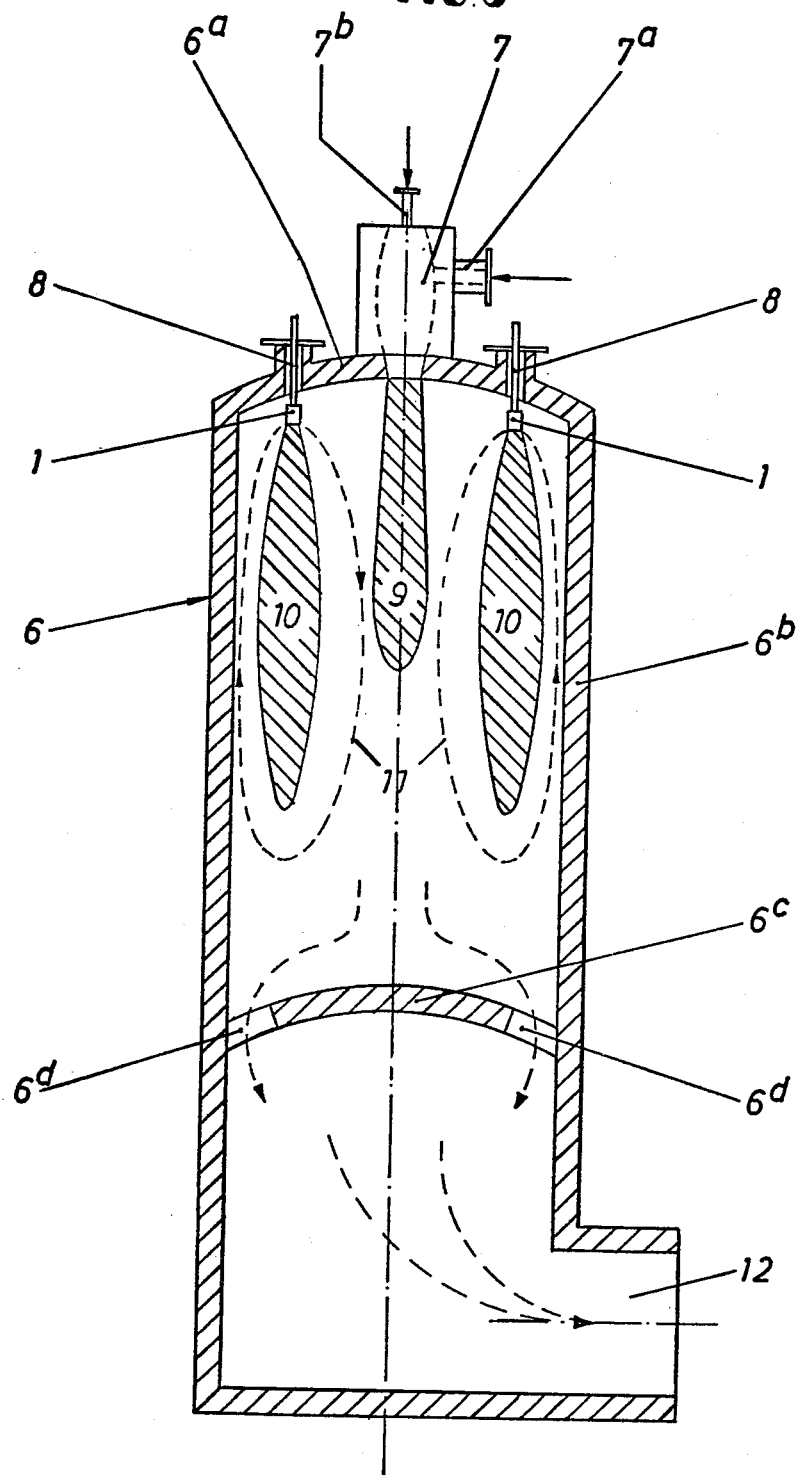
FIG. 5 shows an axial sectional view of the cracking furnace of the present invention in a schematic representation.

According to FIG. 1, the atomizer nozzle 1 consists of an annular ultrasound generator 3 with a resonance chamber $3^a$, to which the operating medium is fed via the annular chamber $3^h$, the bores $3^e$, and the annular space $3^g$; the stream of operating medium is deflected into the resonance chamber by the deflecting surface $3^f$. Toward the rear, a double sleeve 13 adjoins the ultrasound generator 3; the annular duct $3^i$ of this sleeve supplies the operating medium for the ultrasound generator 3. A feed pipe $2^a$ is arranged in the bore $3^k$ of the ultrasound generator 3, leaving an annular gap 15; a pressure atomizer nozzle 16 is associated with the front end of the feed pipe $2^a$. The acid to be atomized flows through the interior 2 of the pipe $2^a$ and through the bores $16^b$ into the turbulence chamber $16^c$. From the turbulence chamber, the acid passes through the opening $16^a$ and enters the ultrasonic field, emanating from the resonance chamber $3^a$, in the form of a cone of coarsely atomized droplets.

The embodiment shown in FIG. 2 differs from the embodiment of FIG. 1 essentially in that a rotary atomizer 19 is arranged in the cavity $3^k$ of the ultrasound generator 3 in place of the pressure atomizer 16. The rotary atomizer 19 comprises essentially an atomizing cap $19^a$, attached at one end of a quill shaft 17 rotatably supported in the bearings 18. The hollow shaft 17 is connected to a rotary drive (not shown) in a suitable manner. A feed pipe 20 for the acid is coaxially mounted in the quill shaft 17 and extends with its front end into the distributing cup $19^a$. At its front end, the feed pipe 20 has several lateral openings $20^a$ for the discharging of the acid into the cup $19^a$. The annular space 15 between the rotary atomizer 19 and the ultrasound generator 3 can be connected, via a pipeline $15^a$, to a compressed-gas source (not shown), so that a gas buffer can be formed in the annular space 15, preventing the entrance of cracked gas. During the operation of this atomizer nozzle, the acid fed through pipe 20 and exiting through openings $20^a$ is forced against the inside of the cup $19^a$ rotating at a high speed. The acid spreads like a sheet over the inner wall of the cup and is flung from the cup edge $19^b$ in the form of droplets into the ultrasonic field, wherein they are converted into a fine mist.

According to FIG. 3, the atomizer nozzle 1 consists of a front sleeve $1^a$ with an internal thread and a rear sleeve 3 with an external thread. The sleeves $1^a$ and 3 are threadedly connected with the interposition of a spacer ring $1^b$. An annular projection $3^b$ is formed at the sleeve 3, extending forwardly approximately to the front edge of the sleeve $1^a$; this projection flares at the front end and contains a forwardly open resonance chamber $3^a$. An axial sleeve $3^d$ having an internal thread is mounted to the front sleeve portion $3^b$ and is connected to the latter with the aid of spokes; the deflecting element 5 with the guide surface $5^a$ is threadedly inserted in this axial sleeve. The waste sulfuric acid is fed through the annular duct 2 and the bores $3^c$ of the sleeve 3 to the outlet opening $2^a$ formed as an annular slot. The operating medium (steam) required for the production of the ultrasonic field is conducted through the internal duct 4, between the spokes $3^e$ along the deflection surface $5^a$ into the annular resonance chamber $3^a$.

In the embodiment according to FIG. 4, the resonance chamber $3^a$ is arranged in the front end of the housing sleeve 3, which front end is reinforced. After the mounting ring 14, provided with bores $14^a$, has been threadedly inserted into the sleeve 3, the deflecting element 5 is threadedly inserted into the inner thread of the mounting ring 14 to such an extent that the operating medium fed through the annular duct 4 is deflected at the guide surface $5^a$ into the resonance chamber $3^a$. Furthermore, a sleeve 13 is threadedly inserted into the outer sleeve 3; this sleeve 13 forms, together with the rear end of the deflecting element 5, the annular duct 4 for feeding the operating medium for the generation of ultrasound. The waste sulfuric acid to be atomized is supplied through the central bore 2 in the deflection element 5 and enters the ultrasonic field produced by the resonance chamber $3^a$ at the front aperture $2^a$.

FIG. 5 shows a vertical cracking furnace 6, wherein a burner muffle with a burner 7 is centrally attached at the ceiling $6^a$ thereof; the burner is provided with feed pipes for air and fuel oil ($7^a$ and $7^b$, respectively). Furthermore, several ultrasonic atomizers 1 are arranged in the furnace ceiling in concentric distribution around the burner 7; these atomizers are adjustable in the vertical direction with the aid of a lance 8. A flame bridge $6^c$ is formed in the furnace chamber at a spacing from the furnace ceiling corresponding to 2.5 times the diameter of the furnace chamber. The flame bridge $6^c$ has gas passages $6^d$ beside the furnace wall $6^b$.

The burner 7 produces a flame 9 oriented axially against the flame bridge $6^c$; the acid mists 10 formed by the ultrasonic atomizers 1 are surrounded by an axially symmetrical gas circulation 11, wherein the vaporization and cracking of the acid are conducted. By the conductance of the combustion gases, the object is achieved that these gases circulate at least partially in the cracking chamber between the ceiling $6^a$ and the bridge $6^c$ before they flow through the openings $6^d$ to the cracked gas outlet 12.

The ultrasonic nebulization of the acid, in conjunction with the circulation of the completely burnt-out combustion gases in the combustion chamber, makes it possible to achieve an almost complete reduction of the hexavalent sulfur contained in the atomized solutions to sulfur dioxide.

What is claimed is:

1. A cracking furnace for waste sulfuric acid comprising:

a furnace chamber of substantially circular cross section having a ceiling and having a side wall;

a burner centrally positioned in said ceiling;

a plurality of ultrasonic atomizer assemblies in said ceiling and distributed around said burner, each of said ultrasonic atomizer assemblies including:

(a) means for converting a feed stream of the waste sulfuric acid into a coarse spray, said means for converting including a cup in said assembly rotatable at a speed of about 4000 to 7000 rpm and means for forcing said feed stream against the inner surface of said cup, and (b) means for generating a field of ultrasonic sound about said cup discharge and for further atomizing the coarse spray, a gas flow constricting member transversing said chamber substantially perpendicular to the longitudinal axis thereof, located at a position from said ceiling at about 1–4 times the length of the diameter of said chamber below said burner, outlet means at the bottom of said chamber below said gas flow constricting member, and supply means for provision of fuel to said burner and second supply means for provision of said feed stream to said atomizer assemblies.

2. A cracking furnace of claim 1 wherein said ultrasonic atomizer assemblies are positioned around said burner in a uniform concentric pattern.

3. A cracking furnace of claim 2, wherein said gas flow constricting member is provided with a plurality of gas passage apertures adjacent said side wall.

4. A cracking furnace of claim 1, wherein said burner comprises a pulsed oil burner.

5. The cracking furnace of claim 3, wherein said gas flow constriction member is convex with respect to said chamber, spaced from the ceiling by a distance approximately 2.5 times the diameter of said chamber and wherein the flame from said burner is oriented axially against said gas flow constricting member.

6. The cracking furnace of claim 1, wherein said means for converting a feed stream into a coarse spray includes an annular space and an annular exit slot having a maximum width of about 1 mm in said assembly and means for passing said feed stream through said space and said slot, and wherein said means for further atomizing said coarse spray includes a bore within said annular space and slot, and means for passing steam therethrough.

7. The cracking furnace of claim 1, wherein said means for converting a feed stream into a coarse spray includes a central bore having a miximum diameter of about 10 mm in said assembly and means for passing said feed stream therethrough and wherein said means for further atomizing said coarse spray includes an annular space around said central bore and means for passing steam therethrough.

8. A cracking furnace for waste sulfuric acid comprising a furnace chamber of substantially circular cross section having a ceiling and a side wall, a burner centrally positioned in said ceiling, a plurality of ultrasonic atomizer assemblies positioned around said burner in a concentric pattern in said ceiling, each of said ultrasonic atomizer assemblies including:
 (a) means for converting a feed stream of the waste sulfuric acid into a coarse spray, and
 (b) means for generating a field of ultrasonic sound and further atomizing the coarse spray,
  a gas flow constricting means transversing said chamber substantially perpendicular to the longitudinal axis thereof, located at a position from said ceiling at about 1–4 times the length of the diameter of said chamber below said burner,
  outlet means at the bottom of said chamber below said gas flow constricting member, and
  supply means for provision of fuel to said burner and second supply means for provision of said feed stream to said atomizer assemblies.

9. A cracking furnace of claim 8 wherein said gas flow constricting member is provided with a plurality of gas passages apertures adjacent said side wall.

10. A cracking furnace of claim 8, wherein said burner comprises a pulsed oil burner.

11. The cracking furnace of claim 8, wherein said gas flow constriction member is convex with respect to said chamber, spaced from the ceiling by a distance approximately 2.5 times the diameter of said chamber and wherein the flame from said burner is oriented axially against said gas flow constricting member.

12. The cracking furnace of claim 8, wherein said means for converting a feed stream into a coarse spray includes portions defining an annular space terminating in an annular exit slot having a maximum width of about 1 mm in said assembly and means for passing said feed stream through said space and said slot, and wherein said means for further atomizing said coarse spary includes portions defining a bore within said annular space and slot, and means for passing steam therethrough.

13. The cracking furnace of claim 8, wherein said means for converting a feed stream into a coarse spray includes a central bore having a maximum diameter of about 10 mm in said assembly and means for passing said feed stream therethrough and wherein said means for further atomizing said coarse spray includes an annular space around said central bore and means for passing steam therethrough.

14. A cracking furnace for waste sulfuric acid comprising a furnace chamber of substantially circular cross section having a ceiling and a side wall,
 a burner centrally positioned in said ceiling,
 a plurality of ultrasonic atomizer assemblies positioned around said burner in a concentric pattern in said ceiling, each of said ultrasonic atomizer assemblies including means for generating ultrasonic sound for atomizing a feed stream of the waste sulfuric acid,
 a gas flow constricting means transversing said chamber substantially perpendicular to the longitudinal axis thereof, located at a position from said ceiling at about 1–4 times the length of the diameter of said chamber below said burner,
 outlet means at the bottom of said chamber below said gas flow constricting member, and
 supply means for provision of fuel to said burner and second supply means for provision of said feed stream to said atomizer assemblies.

15. The cracking furnace of claim 14, wherein said ultrasonic generating means includes portions defining an annular space terminating in an annular exit slot having a maximum width of about 1 mm in said assembly and means for passing said feed stream through said space and said slot, and wherein said ultrasonic generating means includes portions defining a bore within said annular space and slot, and means for passing steam therethrough.

16. A cracking furnace of claim 14, wherein said gas flow constricting member is provided with a plurality of gas passage apertures adjacent said side wall.

17. A cracking furnace of claim 14, wherein said burner comprises a pulsed oil burner.

18. The cracking furnace of claim 14, wherein said gas flow constriction member is convex with respect to said chamber, spaced from the ceiling by a distance approximately 2.5 times the diameter of said chamber and wherein the flame from said burner is oriented axially against said gas flow constricting member.

* * * * *